United States Patent
Chang et al.

(10) Patent No.: US 11,244,137 B2
(45) Date of Patent: Feb. 8, 2022

(54) FINGERPRINT SENSING CONTROL DEVICE AND OPERATION METHOD THEREOF

(71) Applicant: Novatek Microelectronics Corp., Hsinchu (TW)

(72) Inventors: Kuei-Chung Chang, Hsinchu County (TW); Wu Wei Lin, Taoyuan (TW)

(73) Assignee: Novatek Microelectronics Corp., Hsinchu (TW)

(*) Notice: Subject to any disclaimer, the term of this patent is extended or adjusted under 35 U.S.C. 154(b) by 0 days.

(21) Appl. No.: 17/110,331

(22) Filed: Dec. 3, 2020

(65) Prior Publication Data

US 2021/0192168 A1   Jun. 24, 2021

Related U.S. Application Data

(60) Provisional application No. 62/942,751, filed on Dec. 3, 2019.

(51) Int. Cl.
*G06K 9/00* (2006.01)
*G06F 3/041* (2006.01)
*G09G 3/20* (2006.01)

(52) U.S. Cl.
CPC ......... *G06K 9/0002* (2013.01); *G06F 3/0412* (2013.01); *G06F 3/0414* (2013.01); *G06F 3/04166* (2019.05); *G09G 3/2092* (2013.01); *G09G 2310/0286* (2013.01)

(58) Field of Classification Search
None
See application file for complete search history.

(56) References Cited

U.S. PATENT DOCUMENTS

| | | | |
|---|---|---|---|
| 10,061,449 B2 | 8/2018 | Pant et al. |
| 10,061,450 B2 | 8/2018 | Shahparnia et al. |
| 10,067,618 B2 | 9/2018 | Verma et al. |
| 10,664,113 B2 | 5/2020 | Shahparnia et al. |

(Continued)

FOREIGN PATENT DOCUMENTS

TW    201716966    5/2017

OTHER PUBLICATIONS

"Office Action of Taiwan Counterpart Application", dated Dec. 13, 2021, p. 1-p. 7.

*Primary Examiner* — Nicholas J Lee
(74) *Attorney, Agent, or Firm* — JCIPRNET (57) ABSTRACT

A fingerprint sensing control device and an operation method thereof are provided. The fingerprint sensing control device includes a touch control circuit and a fingerprint sensing control circuit. The touch control circuit determines a touched region of an object on the touch panel. The fingerprint sensing control circuit performs a fingerprint sensing control on the touch panel and determines a target sensing sub-region overlaid by the touched region from a plurality of sensing sub-regions of the fingerprint sensing region of the touch panel. When the target sensing sub-region comprises a first sensing sub-region and a second sensing sub-region that are adjacent to each other, the fingerprint sensing control circuit starts to scan the first sensing sub-region in a first direction from a common edge between the first sensing sub-region and the second sensing sub-region and starts to scan the second sensing sub-region in a second direction from the common edge.

16 Claims, 6 Drawing Sheets

(56) References Cited

U.S. PATENT DOCUMENTS

| | | | |
|---|---|---|---|
| 2016/0162011 A1 | 6/2016 | Verma et al. | |
| 2016/0162101 A1 | 6/2016 | Pant et al. | |
| 2016/0162102 A1 | 6/2016 | Shahparnia et al. | |
| 2016/0195990 A1* | 7/2016 | Han | G06F 1/3262 |
| | | | 345/173 |
| 2016/0349882 A1* | 12/2016 | Liu | G06F 3/0412 |
| 2017/0046558 A1* | 2/2017 | Li | G06F 3/0412 |
| 2017/0102821 A1* | 4/2017 | Lai | G06F 3/0446 |
| 2017/0351364 A1* | 12/2017 | Kim | G06F 3/0412 |
| 2018/0101715 A1* | 4/2018 | Lee | G06K 9/00026 |
| 2019/0095006 A1 | 3/2019 | Shahparnia et al. | |
| 2019/0266380 A1* | 8/2019 | Lee | G06K 9/00073 |
| 2020/0364432 A1* | 11/2020 | Hu | G06K 9/00026 |
| 2020/0364439 A1* | 11/2020 | Hu | G06K 9/00013 |

\* cited by examiner

FINGERPRINT SENSING CONTROL DEVICE AND OPERATION METHOD THEREOF

CROSS-REFERENCE TO RELATED APPLICATION

This application claims the priority benefit of U.S. provisional application Ser. No. 62/942,751, filed on Dec. 3, 2019. The entirety of the above-mentioned patent application is hereby incorporated by reference herein and made a part of this specification.

BACKGROUND

Field of the Invention

The invention relates to an electronic device and more particularly, to a fingerprint sensing control device and an operation method thereof.

Description of Related Art

A fingerprint sensor may be placed on a display panel. Or, alternatively, the fingerprint sensor may be placed under the display panel. Or, alternatively, the fingerprint sensor may be embedded in the display panel. Thus, a part (or entire) of a display region of the display panel may serve as a fingerprint sensing region for fingerprint sensing. Generally, as an area of the fingerprint sensing region is increased, a degree of freedom in an operation of a user may be increased. The fingerprint sensor has a plurality of fingerprint sensing units (sensing pixels). When a finger of a user is pressed on any location of the fingerprint sensing region of the display panel, the fingerprint sensor may sense/recognize a fingerprint of the user's finger.

Generally, a fingerprint sensing control circuit scans the fingerprint sensing units row by row in a scanning order from top to bottom, so as to perform fingerprint sensing. Based on the scanning, a system may read sensing results of all the fingerprint sensing units of the fingerprint sensor in a manner of row by row from top to bottom through the fingerprint sensing control circuit. As a size of the panel (an area of the sensing region) is increased, the fingerprint sensing control circuit needs a longer time to perform a reading operation on the entire fingerprint sensing region.

It should be noted that the contents of the section of "Description of Related Art" is used for facilitating the understanding of the invention. A part of the contents (or all of the contents) disclosed in the section of "Description of Related Art" may not pertain to the conventional technology known to the persons with ordinary skilled in the art. The contents disclosed in the section of "Description of Related Art" do not represent that the contents have been known to the persons with ordinary skilled in the art prior to the filing of this invention application.

SUMMARY

The invention provides a fingerprint sensing control device and an operation method thereof to accelerate a scanning operation on a fingerprint sensing region of a touch panel.

A fingerprint sensing control device of the invention is capable of performing a fingerprint sensing control on a touch panel. The touch panel includes a fingerprint sensing region divided into a plurality of sensing sub-regions. The fingerprint sensing control device includes a touch control circuit and a fingerprint sensing control circuit. The touch control circuit is configured to perform touch detection on the touch panel to determine a touched region of an object. The fingerprint sensing control circuit is configured to perform the fingerprint sensing control on the touch panel and determine at least one target sensing sub-region overlaid by the touched region from the sensing sub-regions of the fingerprint sensing region. When the at least one target sensing sub-region includes a first sensing sub-region and a second sensing sub-region that are adjacent to each other, the fingerprint sensing control circuit starts to scan the first sensing sub-region in a first direction from a common edge between the first sensing sub-region and the second sensing sub-region and starts to scan the second sensing sub-region in a second direction from the common edge.

An operation method of the invention includes: performing touch detection on a touch panel by a touch control circuit to determine a touched region of an object, wherein the touch panel includes a fingerprint sensing region divided into a plurality of sensing sub-regions; performing a fingerprint sensing control on the touch panel and determining at least one target sensing sub-region overlaid by the touched region from the plurality of sensing sub-regions of the fingerprint sensing region by a fingerprint sensing control circuit; and when the at least one target sensing sub-region includes a first sensing sub-region and a second sensing sub-region that are adjacent to each other, starting to scan the first sensing sub-region in a first direction from a common edge between the first sensing sub-region and the second sensing sub-region and starting to scan the second sensing sub-region in a second direction from the common edge by the fingerprint sensing control circuit.

Based on the above, the fingerprint sensing region of the touch panel of the embodiments of the invention is divided into a plurality of sensing sub-regions. When the object (e.g., a finger) touches the touch panel, the touch detection can be performed on the touch panel to obtain the touched region of the object. The fingerprint sensing control circuit can determine a target sensing sub-region (or more target sensing sub-regions) from the sensing sub-regions according to the touched region. The fingerprint sensing control circuit can scan scanning lines of the touched region in the target sensing sub-regions and skip scanning (not scan) other scanning lines other than those in the target sensing sub-region, so as to accelerate the scanning operation on the fingerprint sensing region of the touch panel.

To make the above features and advantages of the invention more comprehensible, embodiments accompanied with drawings are described in detail below.

DESCRIPTION OF EMBODIMENTS

The term "couple (or connect)" throughout the specification (including the claims) of this application are used broadly and encompass direct and indirect connection or coupling means. For example, if the disclosure describes a first apparatus being coupled (or connected) to a second apparatus, then it should be interpreted that the first apparatus can be directly connected to the second apparatus, or the first apparatus can be indirectly connected to the second apparatus through other devices or by a certain coupling means. In addition, terms such as "first" and "second" mentioned throughout the specification (including the claims) of this application are only for naming the names of the elements or distinguishing different embodiments or scopes and are not intended to limit the upper limit or the lower limit of the number of the elements not intended to limit sequences of the elements. Moreover, elements/components/steps with same reference numerals represent same or similar parts in the drawings and embodiments. Elements/components/notations with the same reference numerals in different embodiments may be referenced to the related description.

Figure 1:
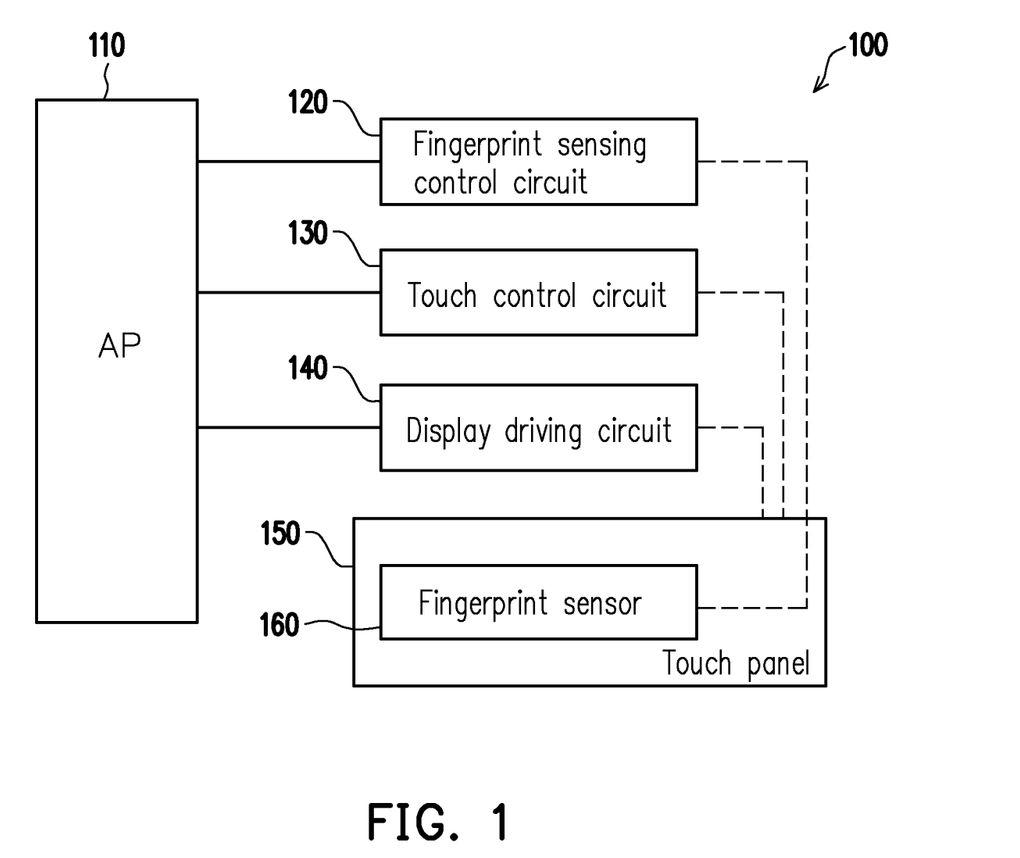
FIG. 1 is a schematic circuit block diagram illustrating an electronic device according to an embodiment of the invention.

FIG. 1 is a schematic circuit block diagram illustrating an electronic device 100 according to an embodiment of the invention. The electronic device 100 may be a mobile apparatus or other non-mobile computing devices. In some embodiments, the electronic apparatus 100 may include an application processor (AP) 110. In some embodiments, the electronic device 100 may further include a touch panel 150 with a display function. In addition, the touch panel 150 may be a touch display panel with a fingerprint sensing function. The embodiment of the present invention does not limit the circuit architecture for implementing touch sensing in the touch panel 150. If the touch panel 150 is a self-capacitive touch sensing architecture, the touch panel 150 may include a touch sensor array. For example, in the touch sensing stage, the common electrodes of a plurality of display pixels are connected to serve as a self-capacitive touch sensor (or called touch sensing electrode).

The electronic device 100 illustrated in FIG. 1 includes a display driving circuit 140 and a fingerprint sensing control device. In the embodiment illustrated in FIG. 1, the fingerprint sensing control device includes a fingerprint sensing control circuit 120 and a touch control circuit 130. It should be noted that even though the fingerprint sensing control circuit 120, the touch control circuit 130 and the display driving circuit 140 are illustrated as different circuit blocks, however, a part or entire of each block may be integrated together with another one (or two) or all of the blocks. In some embodiments, a part of or all of the fingerprint sensing control circuit 120, the touch control circuit 130 and the display driving circuit 140 may be integrated in a single chip or separated as different chips. The chip may communicate with the AP 110 and control the touch panel 150.

Based on a design requirement, in some embodiments, the fingerprint sensing control circuit 120, the touch control circuit 130 and the display driving circuit 140 may be different integrated circuits. In some other embodiments, the touch control circuit 130 and the display driving circuit 140 may be integrated in a touch with display driver integration (TDDI) chip (or a TDDI integrated circuit), and the fingerprint sensing control circuit 120 may be implemented in another chip (or integrated circuit). For example, the touch panel 150 may include a TDDI GOA circuit (not shown), and the TDDI chip (or the TDDI integrated circuit) may communicate with the TDDI GOA circuit to control touch and display operations on the touch panel 150. In yet other embodiments, the fingerprint sensing control circuit 120, the touch control circuit 130 and the display driving circuit 140 may be integrated in a single integrated circuit.

The AP 110 may be coupled to the display driving circuit 140 to provide an image frame. The display driving circuit 140 may be coupled (directly or indirectly) to the touch panel 150. The display driving circuit 140 may drive/control the touch display panel (the touch panel 150) to display an image in a display region of the touch panel 150. For example, the touch panel 150 may include an integrated gate driver on array (GOA) circuit (not shown), and the display driving circuit 140 may communicate with the GOA circuit of the touch panel 150 to control the touch panel 150.

The touch panel 150 may include a touch detector (not shown). For example, the touch panel 150 may be a touch display panel. The touch control circuit 130 is coupled to (and control) the touch detector of the touch panel 150. The touch control circuit 130 may perform touch detection on the touch panel 150 to obtain information about a touched region corresponding to an object (e.g., a finger) on the touch panel 150, such as the area and position of the touched region, and the center coordinates of the touched region. According to the multiple touch sensing values obtained by detecting the touch panel 150 (e.g., detecting the self-capacitive touch sensor array of the touch panel 150), the touch control circuit 130 can calculate the information about the touched region. In the same or an alternative embodiment, the touch control circuit 130 may obtain the touched region of the object on the touch panel 150. The AP 110 is coupled to the touch control circuit 130 to receive a touch detection result. In some embodiments, the AP 110 may obtain the touched region of the object on the touch panel 150.

In the embodiment illustrated in FIG. 1, The touch panel 150 further includes a fingerprint sensor 160, and the fingerprint sensor 160 is embedded in the touch panel 150. Based on a design requirement, the fingerprint sensor 160 may be an optical fingerprint sensor or other fingerprint sensors, such as a capacitive fingerprint sensor. In other embodiments, the fingerprint sensor 160 may be placed outside the touch panel 150, such as placed under the touch panel 150, which is called an under-display configuration, or placed above the touch panel 150, which is called on-display configuration. Thus, a part (or entire) of a display region of the touch panel 150 overlaps with a sensing region of the fingerprint sensor 160 for fingerprint sensing. Generally, as an area of the fingerprint sensing region is increased, a degree of freedom in an operation of a user may be increased.

When a finger of a user is pressed on any location of the fingerprint sensing region of the touch panel 150, the fingerprint sensor 160 may sense/recognize a fingerprint of the user's finger. In some embodiments, the AP 110 is coupled to the fingerprint sensing control circuit 120.

The fingerprint sensing control circuit 120 may be coupled (directly or indirectly) to (and control) the fingerprint sensor 160 of the touch panel 150 to perform a fingerprint sensing control on the touch panel 150 and read a sensing signal, and generate fingerprint image data (digital value). For example, the touch panel 150 may include a GOA circuit (not shown), and the fingerprint sensing control circuit 120 may communicate with the GOA circuit to control the fingerprint sensor 160 of the touch panel 150. The AP 110 may further be coupled to the fingerprint sensing control circuit 120 to receive the fingerprint image data.

In some embodiments, a fingerprint sensing region of the touch panel 150 may be divided into a plurality of sensing sub-regions, and the fingerprint sensing control circuit 120 is further coupled to the touch control circuit 130 to obtain information of the touched region of the object on the touch panel 150. The fingerprint sensing control circuit 120 may determine at least one target sensing sub-region from the sensing sub-regions of the fingerprint sensing region of the touch panel 150 according to the information of the touched region (e.g., one or more of the area and position of the touched region, the center coordinates of the touched region, etc.).

In some other embodiments, the fingerprint sensing control circuit 120 is not coupled to the touch control circuit 130. The touch control circuit 130 may provide the information of the touched region of the object on the touch panel 150 to the AP 110, and the AP 110 may directly provide (or provide after processing) the information of the touched region provided by the touch control circuit 130 to the fingerprint sensing control circuit 120. In some embodiments, the fingerprint sensing region of the touch panel 150 may be divided into a plurality of sensing sub-regions, and the fingerprint sensing control circuit 120 may obtain at least one sensing sub-region command corresponding to the information of the touched region from the AP 110. The fingerprint sensing control circuit 120 may determine at least one target sensing sub-region from the sensing sub-regions of the fingerprint sensing region of the touch panel 150 according to the sensing sub-region command.

Figure 2:
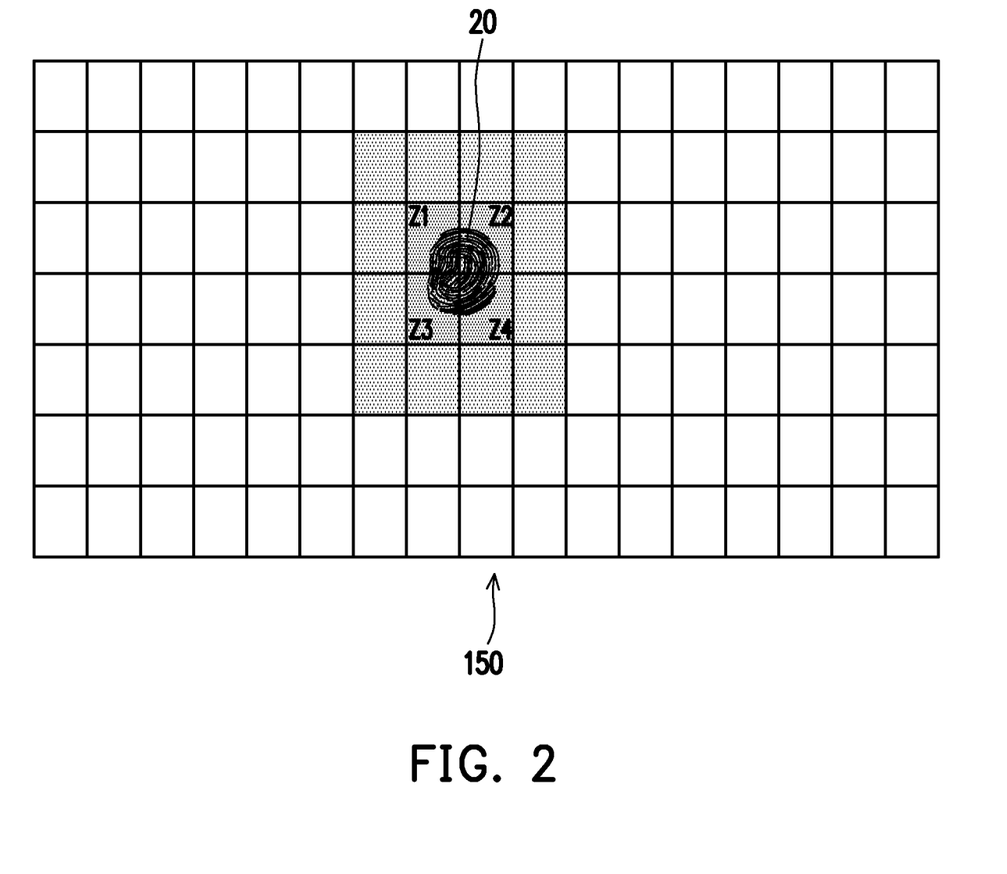
FIG. 2 is a schematic diagram illustrating an operation scenario of the touch panel according to an embodiment of the invention.

FIG. 2 is a schematic diagram illustrating an operation scenario of the touch panel 150 according to an embodiment of the invention. Referring to FIG. 1 and FIG. 2, the touch control circuit 130 may perform touch detection on the touch panel 150 to obtain a touched region 20 of a finger on the touch panel 150. In the example illustrated in FIG. 2, the sensing region of the touch panel 150 is divided into a plurality of fingerprint sensing unit zones (i.e., a plurality of small blocks illustrated in FIG. 2, such as the fingerprint sensing unit zones Z1, Z2, Z3 and Z4 illustrated in FIG. 2).

The touch control circuit 130 may perform the touch detection on the touch panel 150 to determine the touched region 20 corresponding to an object (e.g., one or more fingers) on the touch panel 150. The fingerprint sensing control circuit 120 may determines at least one target fingerprint sensing unit zone from the fingerprint sensing unit zones of the touch panel 150 according to the information of the touched region 20. For example, the fingerprint sensing control circuit 120 may determine a location of the target fingerprint sensing unit zone according to the area and location of the touched region 20 or the center coordinates of the touched region 20. The touched region 20 may be located in the at least one target fingerprint sensing unit zone. In addition, the fingerprint sensing control circuit 120 may determine a total number of the target fingerprint sensing unit zones according to an area of the touched region 20. In the example illustrated in FIG. 2, because the touched region 20 overlaps and covers the fingerprint sensing unit zones Z1, Z2, Z3 and Z4, the fingerprint sensing control circuit 120 may determine the fingerprint sensing unit zones Z1, Z2, Z3 and Z4 as the target fingerprint sensing unit zones.

Figure 3:
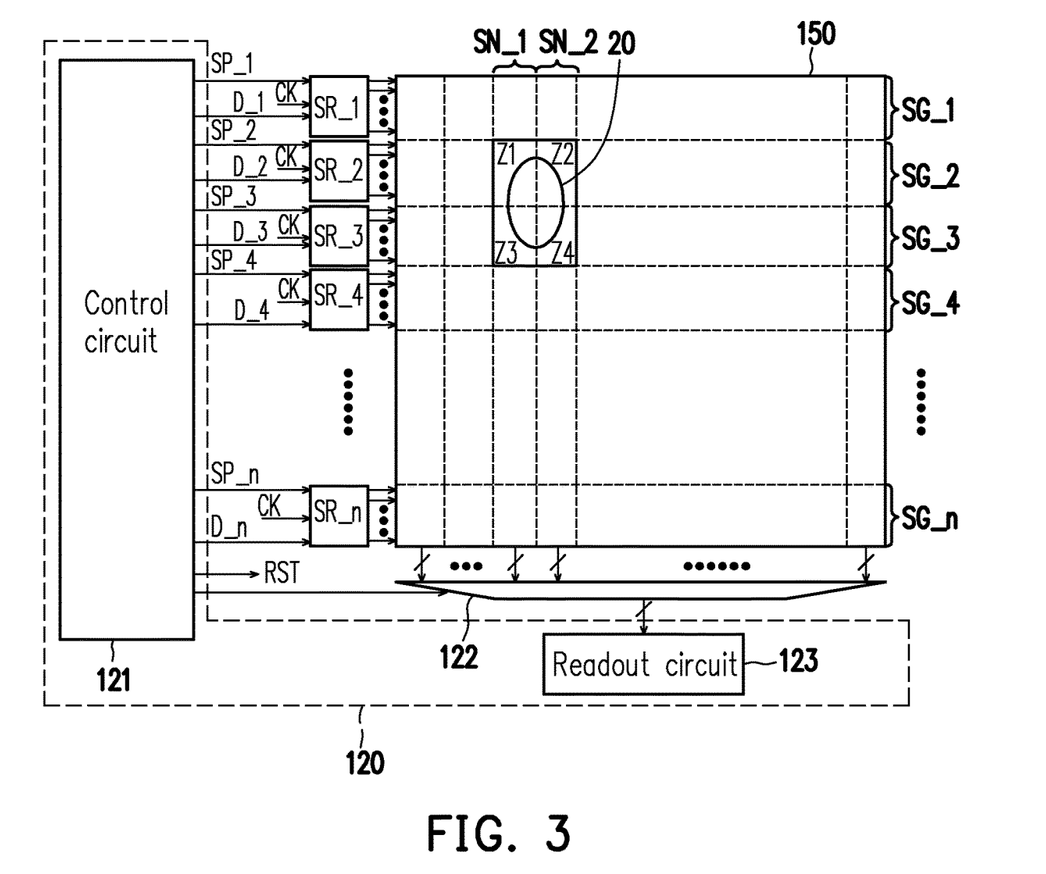
FIG. 3 is a schematic circuit block diagram illustrating the fingerprint sensing control circuit according to an embodiment of the invention.

FIG. 3 is a schematic circuit block diagram illustrating the fingerprint sensing control circuit 120 according to an embodiment of the invention. A touch panel 150 illustrated in FIG. 3 may be inferred with reference to the description related to the touch panel 150 illustrated in FIG. 2 and thus, will not be repeated. Referring to FIG. 1 and FIG. 3, the fingerprint sensing control circuit 120 includes a control circuit 121 and a readout circuit 123. The touch panel 150 includes one or more sensing groups extending in a column direction, for example, sensing groups SN_1 and SN_2 illustrated in FIG. 3. Each of the sensing groups includes one or more sensing lines. A multiplexer circuit 122 is coupled to the sensing groups of the touch panel 150. The fingerprint readout circuit 123 is coupled to the multiplexer circuit 122. Based on a design requirement, the multiplexer circuit 122 may be disposed on the touch panel 150. In other embodiments, the multiplexer circuit 122 may be disposed in the fingerprint sensing control circuit 120.

The fingerprint readout circuit 123 may read sensing signals (fingerprint sensing results) of the touched region 20 pressed by the finger from the target fingerprint sensing unit zones Z1, Z2, Z3 and Z4 through the multiplexer circuit 122 and skip reading fingerprint sensing unit zones other than the target fingerprint sensing unit zones Z1, Z2, Z3 and Z4 among the fingerprint sensing unit zones of the touch panel 150. For example, the control circuit 121 may control the multiplexer circuit 122 to turn on one or more signal paths from the target sensing groups SN_1 and SN_2 of the touched region 20 pressed by the finger to the fingerprint readout circuit 123 and turn off a plurality of signal paths from sensing groups other than the target sensing groups SN_1 and SN_2 among the sensing groups to the fingerprint readout circuit 123.

The touch panel 150 further includes one or more shift register circuits, for example, shift register circuits SR_1, SR_2, SR_3, SR_4, . . . and SR_n illustrated in FIG. 3, wherein n may be an arbitrary integer determined based on a design requirement, each shift register circuit includes a plurality of shift register units. Each shift register circuit outputs scan signals for controlling a plurality of fingerprint scan lines, wherein each scanning signal is a signal that controls the gate of the reset transistor of the fingerprint pixel circuit, or a signal that controls the gate of the selection transistor of the fingerprint pixel circuit. The reset transistor is turned on to control the fingerprint pixel circuit to be reset, and the selection transistor is turned on to control the sensing signal to be read out. In other words, the reset transistor and/or the selection transistor of the fingerprint pixel circuit can be controlled according to the fingerprint sensing control circuit and corresponding method of the embodiment of the present invention. Based on a design requirement, the shift register circuits SR_1 to SR_n disposed on the touch panel 150 may be integrated gate driver on array (GOA) circuits. In other embodiments, the shift register circuits SR_1 to SR_n may be disposed in the fingerprint sensing control circuit 120. In other embodiments, based on a design requirement, a part or entire of the fingerprint sensing control circuit 120 and a part or entire of the GOA circuit may be integrated or separated.

The fingerprint sensing region of the touch panel 150 illustrated in FIG. 3 may be divided into a plurality of sensing sub-regions SG_1, SG_2, SG_3, SG_4, . . . and SG_n along the vertical direction, which are called sensing sub-regions. Each sensing sub-area includes a plurality of fingerprint sensing unit zones with a smaller area, such as fingerprint sensing unit zones Z1, Z2, Z3, and Z4 in FIG. 2. Each of the sensing sub-regions SG_1 to SG_n includes one or more scanning lines. Each of the sensing sub-regions SG_1 to SG_n may be coupled to a corresponding one of the shift register circuits SR_1 to SR_n, as illustrated in FIG. 3.

Each of the shift register circuits SR_1 to SR_n may receive a start pulse signal among a plurality of start pulse signals (e.g., SP_1, SP_2, SP_3, SP_4, . . . and SP_n from the control circuit 121) and receive a direction control signal among a plurality of direction control signals (e.g., D_1, D_2, D_3, D_4, . . . and D_n from the control circuit 121). The GOA circuit may generate or receive a clock signal CK, and the clock signal CK may trigger the shift register circuits SR_1 to SR_n to control a plurality of fingerprint sensing units of the touch panel 150. Implementation details of the shift register circuits SR_1 to SR_n are not limited in the present embodiment. Based on a design requirement, in some embodiments, any one of the shift register circuits SR_1 to SR_n may be a conventional shifting register or other shifting register circuits.

Figure 4:
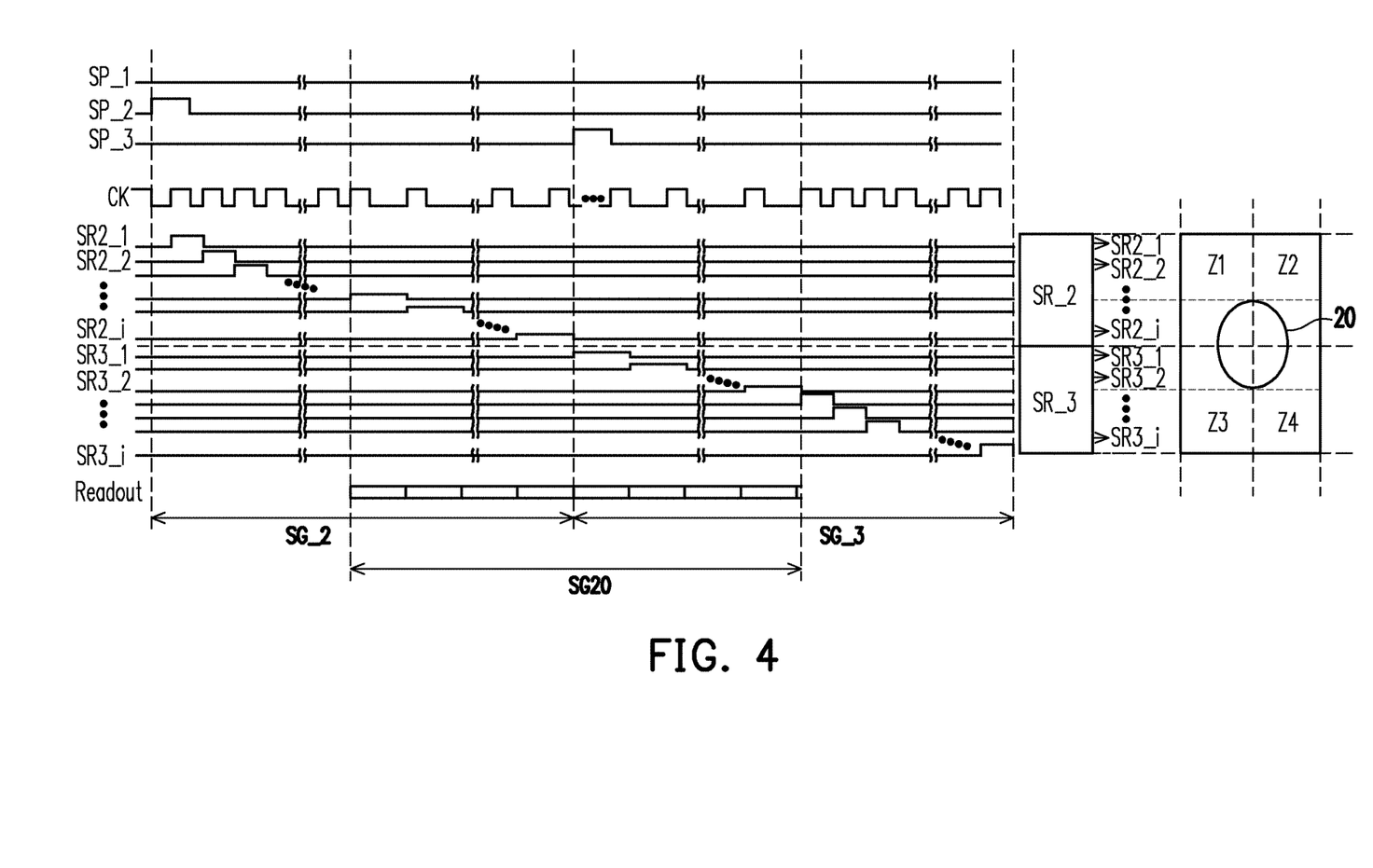
FIG. 4 is a schematic signal timing diagram of the fingerprint sensing control circuit according to an embodiment of the invention.

FIG. 4 is a schematic signal timing diagram of the fingerprint sensing control circuit 120 according to an embodiment of the invention. The embodiment illustrated in FIG. 4 may be applied to (but not limited to) the embodiment illustrated in FIG. 3. The touched region 20, the target fingerprint sensing unit zones Z1 to Z4, and the shift register circuits SR_2 and SR_3 illustrated in FIG. 3 are extracted at the right side in FIG. 4. Referring to FIG. 3 and FIG. 4, the control circuit 121 may adjust a logic state of each of the direction control signals D_1 to D_n, so as to change a shift direction (corresponding to fingerprint scanning direction) of each of the shift register circuits SR_1 to SR_n. For example, the control circuit 121 may set the logic state of each of the direction control signals D_1 to D_n to a first logic state (e.g., a high logic level) to control the shift direction (scanning direction) of each of the shift register circuits SR_1 to SR_n to be a first direction (e.g., from bottom to top). In the embodiment illustrated in FIG. 4, it is assumed that the logic state of each of the direction control signals D_1 to D_n is set to a second logic state (e.g., a low logic level), thereby representing that the shift direction (scanning direction) of each of the shift register circuits SR_1 to SR_n is a second direction (e.g., from top to bottom). According to the start pulse signal SP_2 and the clock signal CK, the shift register circuit SR_2 may output scanning signals SR2_1, SR2_2, . . . and SR2_i to the sensing sub-region SG_2, wherein i may be an arbitrary integer determined based on a design requirement. According to the start pulse signal SP_3 and the clock signal CK, the shift register circuit SR_3 may output scanning signals SR3_1, SR2_3, . . . and SR3_i to the sensing sub-region SG_3.

In some embodiments, the control circuit 121 may obtain information (including a location and/or an area size, or center coordinates, etc.) of the touched region 20 from the touch control circuit 130. In some other embodiments, the control circuit 121 may obtain the information of the touched region 20 from the AP 110. The control circuit 121 may perform an accelerated scanning operation according to the information of the touched region 20. In the embodiment illustrated in FIG. 4, the "accelerated scanning operation" includes: by the control circuit 121, skipping the scanning of the sensing sub-regions SG_1 and SG_4 to SG_n other than the sensing sub-regions SG_2 and SG_3 to which the target fingerprint sensing unit zones Z1, Z2, Z3 and Z4 belong, wherein the "skipping" operation includes not transmitting any scanning signal to the sensing sub-regions SG_1 and SG_4 to SG_n. For example, according to the information of the touched region 20, the control circuit 121 may apply a corresponding start pulse to the target shift register circuits SR_2 and SR_3, but does not apply the start pulse to the other shift register circuits SR_1 and SR_4 to SR_n, as illustrated in FIG. 4. Namely, the start pulse is provided to trigger the target shift register circuits SR_2 and SR_3 corresponding to the target sensing sub-regions SG_2 and SG_3, and the start pulse is not provided to the shift register circuits SR_1 and SR_4 to SR_n corresponding to the sensing sub-regions SG_1 and SG_4 to SG_n other than the sensing sub-regions SG_2 and SG_3 to which the target fingerprint sensing unit zones Z1, Z2, Z3 and Z4 belong.

In the embodiment illustrated in FIG. 4, the control circuit 121 may set a scanning speed of a target scan period SG20 corresponding to the touched region 20 to a first speed and set a scanning speed of a scan period other than the target scanning period SG20 to a second speed (wherein the second speed is higher than the first speed). For example, the control circuit 121 may set the clock signal CK in the target scanning period SG20 to have a first frequency and set the clock signal CK in the scan period other than the target scanning period SG20 to have a second frequency (wherein the second frequency is higher than the first frequency). Namely, a scanning speed for the target sensing sub-regions SG_2 and SG_3 to which the target fingerprint sensing unit zones Z1, Z2, Z3 and Z4 belong is set to a first speed, and a scanning speed for the sensing sub-regions other than the target sensing sub-regions SG_2 and SG_3 among the sensing sub-regions SG_1 to SG_n is set to a second speed (wherein the second speed is greater than the first speed).

Figure 5:
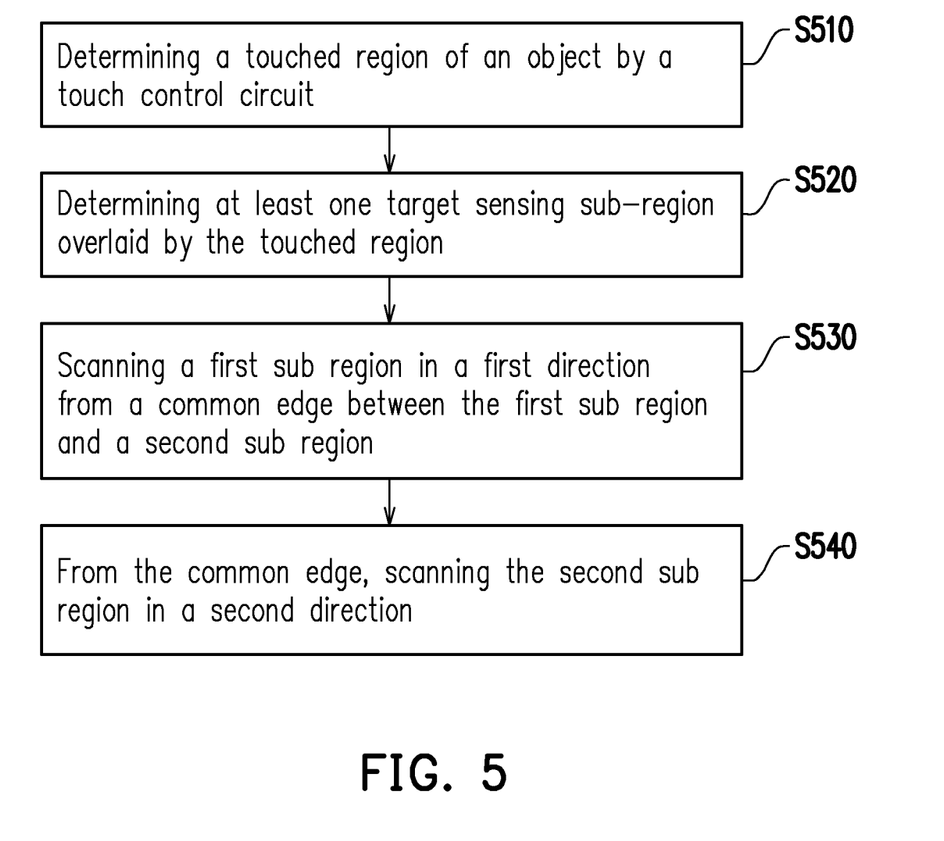
FIG. 5 is a flowchart illustrating an operation method of a fingerprint sensing control device according to an embodiment of the invention.

FIG. 5 is a flowchart illustrating an operation method of a fingerprint sensing control device according to an embodiment of the invention. Referring to FIG. 1, FIG. 3 and FIG. 5, in step S510, the touch control circuit 130 may perform touch detection on the touch panel 150 to determine the touched region 20 corresponding to an object (e.g., one or more fingers) in the touched region 20 on the touch panel 150. In step S520, the fingerprint sensing control circuit 120 may perform a fingerprint sensing control on the touch panel 150 and determine at least one target sensing sub-region overlaid by the touched region from the sensing sub-regions SG_1 to SG_n of the fingerprint sensing region of the touch panel 150. For example, in the operational scenario illustrated in FIG. 3, the fingerprint sensing control circuit 120 may determine the sensing sub-regions SG_2 and SG_3 among the plurality of sensing sub-regions SG_1 to SG_n of the touch panel 150 as target sensing sub-regions (because the touched region 20 overlaps and covers the sensing sub-regions SG_2 and SG_3).

Figure 6:
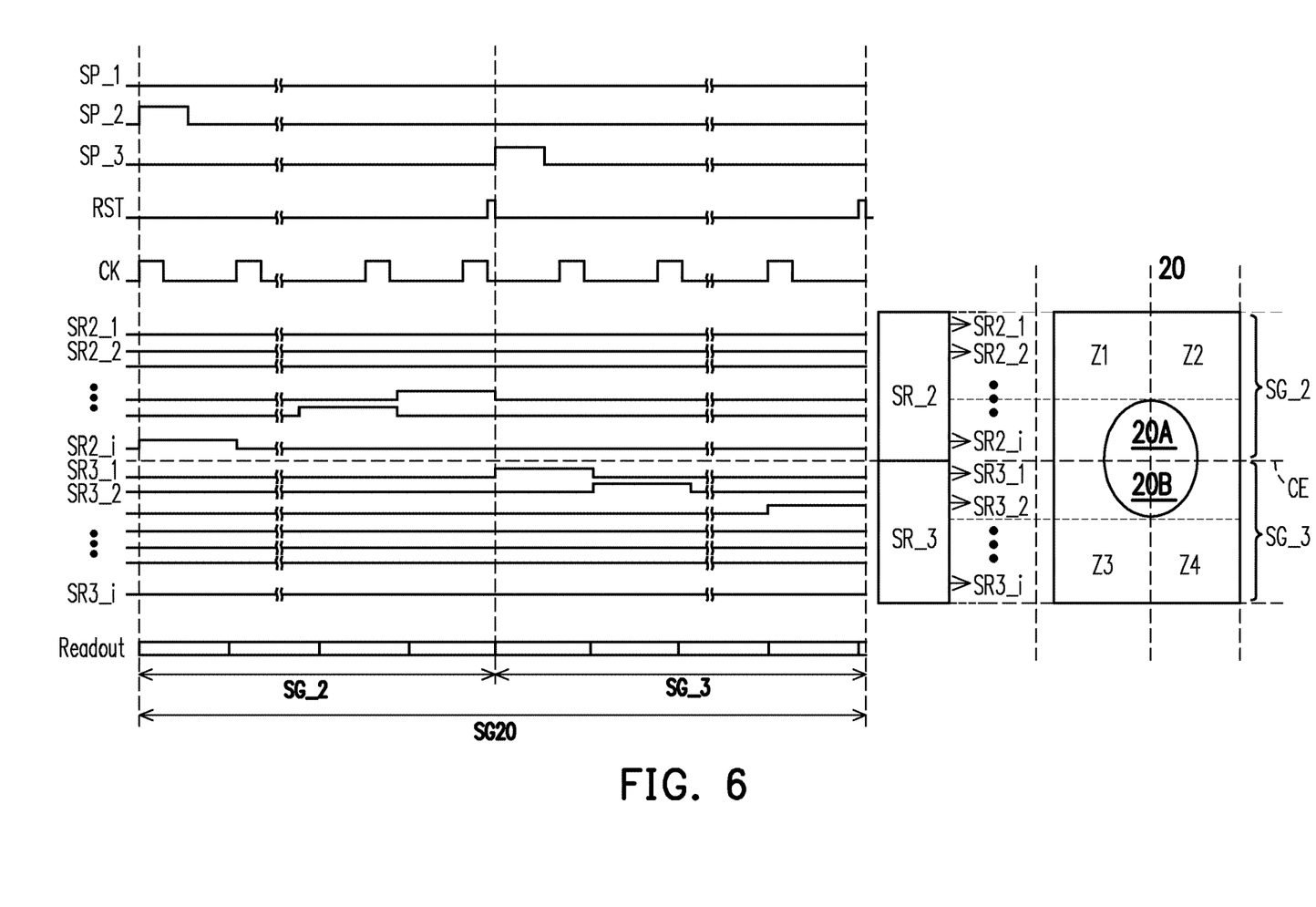
FIG. 6 is a schematic signal timing diagram of the fingerprint sensing control circuit according to another embodiment of the invention.

FIG. 6 is a schematic signal timing diagram of the fingerprint sensing control circuit 120 according to another embodiment of the invention. The embodiment illustrated in FIG. 6 may be applied to (but not limited to) the embodiment illustrated in FIG. 3. The touched region 20, the target fingerprint sensing unit zones Z1 to Z4, and the shift register circuits SR_2 and SR_3 illustrated in FIG. 3 are extracted at the right side in FIG. 6. The touched region 20 is divided into a first touched region 20A and a second touched region 20B based on the common edge CE between the target sensing sub-regions SG_2 and SG_3. The first touched region 20A falls within the sensing sub-region SG_2, and the second touched region 20B falls within the sensing sub-region SG_3. The embodiment illustrated in FIG. 6 may be inferred with reference to the description related to FIG. 4. Referring to FIG. 3, FIG. 5 and FIG. 6, the control circuit 121 may output a reset signal RST, so as to reset the shift register circuits SR_1 to SR_n. After the reset, according to the start pulse signal SP_2 and the clock signal CK, the shift register circuit SR_2 may output scanning signals SR2_1 to SR2_i to the sensing sub-region SG_2. According to the start pulse signal SP_3 and the clock signal CK, the shift register circuit SR_3 may output scanning signals SR3_1 to SR3_i to the sensing sub-region SG_3.

The control circuit 121 may obtain information (including a location and/or an area size) of the touched region 20 from the touch control circuit 130 (or the AP 110). The control circuit 121 may perform the operation method illustrated in FIG. 5 according to the information of the touched region 20. In the operational scenario illustrated in FIG. 3, the target sensing sub-regions include the sensing sub-region SG_2 (a first sensing sub-region) and the sensing sub-region SG_3 (a second sensing sub-region) that are adjacent to each other. Referring to FIG. 3, FIG. 5 and FIG. 6, in step S530, the control circuit 120 may apply a pulse to the start pulse signal SP2 and set the logic state of the direction control signal D_2 to a first logic state (e.g., a high logic level) to control the shift direction (scanning direction) of the shift register circuit SR_2 to a first direction (e.g., from bottom to top). Thus, the fingerprint sensing control circuit 120 may control the shift register circuit SR_2, so as to scan the sensing sub-region SG_2 in the first direction (e.g., from bottom to top) from the common edge CE between the target sensing sub-regions SG_2 and SG_3. When the fingerprint sensing control circuit 120 completes the scanning in the first direction which is started from the common edge CE, but does not yet complete the scanning of the sensing sub-region SG_2, the fingerprint sensing control circuit 120 may reset the shift register circuit SR_2 corresponding to the sensing sub-region SG_2 by the reset signal RST to stop scanning the sensing sub-region SG_2.

In step S540, the fingerprint sensing control circuit 120 may apply the pulse to the start pulse signal SP3 and set the logic state of the direction control signal D_3 to a second logic state (e.g., a low logic level) to control the shift direction (scanning direction) of the shift register circuit SR_3 in a second direction (e.g., from top to bottom). Thus, the fingerprint sensing control circuit 120 may control the shift register circuit SR_3, so as to scan the sensing sub-region SG_3 in the second direction (e.g., from top to bottom) from the common edge CE. When the fingerprint sensing control circuit 120 completes the scanning in the second direction which is started from the common edge CE, but does not yet complete the scanning of the sensing sub-region SG_3, the fingerprint sensing control circuit 120 may reset the shift register circuit SR_3 corresponding to the sensing sub-region SG_3 by the reset signal RST to stop scanning the sensing sub-region SG_3.

Based on a design requirement, in some embodiments, the fingerprint sensing control circuit 120 may not apply any pulse to the other start pulse signals SP_1 and SP_4 to SP_n. Thus, the fingerprint sensing control circuit 120 may skip scanning other sensing sub-regions SG_1 and SG_4 to SG_n among the sensing sub-regions SG_1 to SG_n which are not overlaid by the touched region 20.

When the target sensing sub-region is a single target sensing sub-region, the fingerprint sensing control circuit 120 may starts to scan the single target sensing sub-region in the first direction (or the second direction) from an edge of the single target sensing sub-region. When the fingerprint sensing control circuit 120 completes the scanning of the touched region 20, but does not yet complete the scanning of the single target sensing sub-region, the fingerprint sensing control circuit 120 may reset the shift register circuit corresponding to the single target sensing sub-region to stop scanning the single target sensing sub-region.

When the number of sensing sub-regions divided by the fingerprint sensor 160 in the vertical direction increases, the number of start pulse signals that the control circuit 121 needs to output also increases. For example, when the fingerprint sensor 160 has 32 sensing sub-regions, the fingerprint sensing circuit of the foregoing embodiment must provide 32 start pulse signals to the touch panel 150. Therefore, according to another embodiment of the present invention, a decoder may be provided in the GOA circuit for fingerprint sensing of the touch panel 150, and the control circuit 121 outputs M (for example, 5) control signals (which can be expressed as B[0:(M−1)], such as B[0:4]) to indicate the status of $2^M$ (for example, 32) start pulse signals provided or not to the GOA circuit for fingerprint sensing of the touch panel 150. The decoder decodes the M control signals to generate $2^M$ corresponding start pulse signals. In this way, the chip pins used to transmit the start pulse signal can be greatly reduced. For example, when the touched region is located, in 32 fingerprint sensing sub-regions from top to bottom, the third sensing sub-region (considered as the upper area) and the fourth sensing sub-region (considered as the lower area), the fingerprint sensing circuit can output the control signal S[0:4]=00010 to make the decoder generate and output the start pulse signal to the shift register circuit SR_3, and the fingerprint sensing circuit can output the control signal S[0:4]=00011 to make the decoder generate and output the start pulse signal to the shift register circuit SR_4.

Based on different design demands, the blocks of the AP 110, the fingerprint sensing control circuit 120, the control circuit 121, the readout circuit 123 and (or) the touch control circuit 130 may be implemented in a form of hardware, firmware, software (i.e., programs) or in a combination of many of the aforementioned three forms.

In terms of the hardware form, the blocks of the AP 110, the fingerprint sensing control circuit 120, the control circuit 121, the readout circuit 123 and (or) the touch control circuit 130 may be implemented in a logic circuit on the integrated circuit. Related functions of the AP 110, the fingerprint sensing control circuit 120, the control circuit 121, the readout circuit 123 and (or) the touch control circuit 130 may be implemented in a form of hardware by utilizing hardware description languages (e.g., Verilog HDL or VHDL) or other suitable programming languages. For example, the related functions of the AP 110, the fingerprint sensing control circuit 120, the control circuit 121, the readout circuit 123 and (or) the touch control circuit 130 may be implemented in one or more controllers, microcontrollers, microprocessors, application-specific integrated circuits (ASICs), digital signal processors (DSPs), field programmable gate arrays (FPGAs) and/or various logic blocks, modules and circuits in other processing units.

In terms of the software form and/or the firmware form, the related functions of the AP 110, the fingerprint sensing control circuit 120, the control circuit 121, the readout circuit 123 and (or) the touch control circuit 130 may be implemented as programming codes. For example, the AP 110, the fingerprint sensing control circuit 120, the control circuit 121, the readout circuit 123 and (or) the touch control circuit 130 may be implemented by using general programming languages (e.g., C or C++) or other suitable programming languages. The programming codes may be recorded/stored in recording media, and the aforementioned recording media include, for example, a read only memory (ROM), a storage device and/or a random access memory (RAM). The programming codes may be accessed from the recording medium and executed by a computer, a central processing unit (CPU), a controller, a micro-controller or a microprocessor to accomplish the related functions. As for the recording medium, a "non-transitory computer readable medium", such as a tape, a disk, a card, a semiconductor memory or a programming logic circuit, may be used. In addition, the programs may be provided to the computer (or the CPU) through any transmission medium (e.g., a communication network or radio waves). The communication network is, for example, the Internet, wired communication, wireless communication or other communication media.

Based on the above, the sensing region of the touch panel of the embodiments of the invention is divided into a plurality of sensing sub-regions. When the object (e.g., the finger) touches the display panel, the touch detection can be performed on the touch panel to obtain the touched region of the object. The fingerprint sensing control circuit can determine a target sensing sub-region (or more target sensing sub-regions) from the sensing sub-regions according to the touched region. The fingerprint sensing control circuit can scan the scanning lines of the touched region in the target sensing sub-regions and skip scanning (not scan) other scanning lines other than those in the target sensing sub-region, so as to accelerate the scanning operation on the fingerprint sensing region of the touch panel.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A fingerprint sensing control device, capable of performing a fingerprint sensing control on a touch panel, wherein the touch panel comprises a fingerprint sensing region divided into a plurality of sensing sub-regions, the fingerprint sensing control device comprising:
   a touch control circuit, configured to perform a touch detection on the display panel to determine a touched region of an object; and
   a fingerprint sensing control circuit, configured to perform the fingerprint sensing control on the touch panel and determine at least one target sensing sub-region overlaid by the touched region from the plurality of sensing sub-regions of the fingerprint sensing region, wherein when the at least one target sensing sub-region comprises a first sensing sub-region and a second sensing sub-region that are adjacent to each other, the fingerprint sensing control circuit starts to scan the first sensing sub-region in a first direction from a common edge between the first sensing sub-region and the second sensing sub-region and starts to scan the second sensing sub-region in a second direction from the common edge.

2. The fingerprint sensing control device according to claim 1, wherein
   the fingerprint sensing control circuit skips scanning other sensing sub-regions among the plurality of sensing sub-regions which are not overlaid by the touched region.

3. The fingerprint sensing control device according to claim 1, wherein
   when the at least one target sensing sub-region is a single target sensing sub-region, the fingerprint sensing control circuit starts to scan the single target sensing sub-region in the first direction or the second direction from an edge of the single target sensing sub-region, and
   when the fingerprint sensing control circuit completes the scanning of the touched region, but does not yet complete the scanning of the single target sensing sub-region, the fingerprint sensing control circuit resets a shift register circuit corresponding to the single target sensing sub-region to stop scanning the single target sensing sub-region.

4. The fingerprint sensing control device according to claim 1, wherein the touched region is divided into a first touched region and a second touched region based on the common edge, the first touched region falls within the first sensing sub-region, and the second touched region falls within the second sensing sub-region,
   when the fingerprint sensing control circuit completes the scanning of the first touched region in the first direction which is started from the common edge, but does not yet complete the scanning of the first sensing sub-region, the fingerprint sensing control circuit resets a first shift register circuit corresponding to the first sensing sub-region to stop scanning the first sensing sub-region, and
   when the fingerprint sensing control circuit completes the scanning of the second touched region in the second direction which is started from the common edge, but does not yet complete the scanning of the second sensing sub-region, the fingerprint sensing control circuit resets a second shift register circuit corresponding to the second sensing sub-region to stop scanning the second sensing sub-region.

5. The fingerprint sensing control device according to claim 1, wherein the touch panel is a touch display panel with a fingerprint sensing function.

6. The fingerprint sensing control device according to claim 5, further comprising:
   a display driving circuit, configured to drive the touch display panel to display an image in a display region of the touch display panel.

7. The fingerprint sensing control device according to claim 1, wherein the touch control circuit provides information of the touched region to an application processor, the fingerprint sensing control circuit obtains a sub-region command corresponding to the information of the touched region from the application processor, and the fingerprint sensing control circuit determines the at least one target sensing sub-region from the plurality of sensing sub-regions of the fingerprint sensing region according to the sub-region command.

8. The fingerprint sensing control device according to claim 1, the fingerprint sensing control circuit is coupled to the touch control circuit to obtain information of the touched region, and the fingerprint sensing control circuit determines the at least one target sensing sub-region from the plurality of sensing sub-regions of the fingerprint sensing region according to the information of the touched region.

9. An operation method of a fingerprint sensing control device, comprising:
   performing touch detection on a touch panel by a touch control circuit to determine a touched region of an object, wherein the display panel comprises a fingerprint sensing region divided into a plurality of sensing sub-regions;
   performing a fingerprint sensing control on the touch panel and determining at least one target sensing sub-region overlaid by the touched region from the plurality of sensing sub-regions of the fingerprint sensing region by a fingerprint sensing control circuit; and when the at least one target sensing sub-region comprises a first sensing sub-region and a second sensing sub-region that are adjacent to each other, starting to scan the first sensing sub-region in a first direction from a common edge between the first sensing sub-region and the second sensing sub-region and starting to scan the second sensing sub-region in a second direction from the common edge by the fingerprint sensing control circuit.

10. The operation method according to claim 9, further comprising:
skipping scanning other sensing sub-regions among the plurality of sensing sub-regions which are not overlaid by the touched region.

11. The operation method according to claim 9, further comprising:
when the at least one target sensing sub-region is a single target sensing sub-region, starting to scan the single target sensing sub-region in the first direction or the second direction from an edge of the single target sensing sub-region by the fingerprint sensing control circuit; and
when the scanning of the touched region is completed, but the scanning of the single target sensing sub-region is not yet completed, resetting a shift register circuit corresponding to the single target sensing sub-region to stop scanning the single target sensing sub-region.

12. The operation method according to claim 9, wherein the touched region is divided into a first touched region and a second touched region based on the common edge, the first touched region falls within the first sensing sub-region, the second touched region falls within the second sensing sub-region, and the operation method further comprises:
when the scanning of the first touched region is completed, but the scanning of the first sensing sub-region is not yet completed, resetting a first shift register circuit corresponding to the first sensing sub-region to stop scanning the first sensing sub-region; and
when the scanning of the second touched region is completed, but the scanning of the second sensing sub-region is not yet completed, resetting a second shift register circuit corresponding to the second sensing sub-region to stop scanning the second sensing sub-region.

13. The operation method according to claim 9, wherein the touch panel is a touch display panel with a fingerprint sensing function.

14. The operation method according to claim 13, further comprising:
driving the touch display panel by a display driving circuit to display an image in a display region of the touch display panel.

15. The operation method according to claim 9, further comprising:
providing information of the touched region to an application processor by the touch control circuit;
obtaining a sub-region command corresponding to the information of the touched region from the application processor by the fingerprint sensing control circuit; and
determining the at least one target sensing sub-region from the plurality of sensing sub-regions of the fingerprint sensing region according to the sub-region command.

16. The operation method according to claim 9, further comprising:
obtaining information of the touched region from the touch control circuit by the fingerprint sensing control circuit; and
determining the at least one target sensing sub-region from the sensing sub-regions of the fingerprint sensing region according to the information of the touched region.

* * * * *